United States Patent [19]

Kachadorian

[11] 4,089,142
[45] May 16, 1978

[54] SOLAR-HEATED CONCRETE SLAB BUILDING STRUCTURE

[76] Inventor: James Kachadorian, Royalton, Vt. 05068

[21] Appl. No.: 782,811

[22] Filed: Mar. 30, 1977

[51] Int. Cl.² .......................... E02D 27/32; F24H 7/00
[52] U.S. Cl. .............................. 52/169.11; 52/169.14; 62/260; 126/400; 165/45; 165/DIG. 15; 237/1 A
[58] Field of Search ................ 52/169.11, 473, 169.14; 126/270, 400; 237/1 A; 165/45, DIG. 15; 62/260

[56] References Cited

U.S. PATENT DOCUMENTS

| | | | |
|---|---|---|---|
| 2,559,870 | 7/1951 | Gay | 237/1 A |
| 2,559,871 | 7/1951 | Gay | 126/270 |
| 2,829,504 | 4/1958 | Schlichtig | 62/260 X |
| 3,022,549 | 2/1962 | Cummings | 52/473 X |
| 3,239,144 | 3/1966 | Lueder | 237/1 A |
| 3,243,117 | 3/1966 | Morgan | 237/1 R |
| 3,369,541 | 2/1968 | Thomason | 126/400 |
| 3,412,728 | 11/1968 | Thomason | 126/270 |
| 3,527,921 | 9/1970 | Vogelesonger | 165/45 |
| 3,894,685 | 7/1975 | Keyes et al. | 237/1 A |
| 3,902,474 | 9/1975 | Pyle | 126/270 |
| 3,932,992 | 1/1976 | Martin | 60/431 |
| 3,946,720 | 3/1976 | Keyes et al. | 126/270 |
| 3,960,135 | 6/1976 | Angilletta | 126/270 |
| 3,965,972 | 6/1976 | Peterson | 237/1 A |
| 3,983,929 | 10/1976 | Thomason | 126/400 |
| 3,987,786 | 10/1976 | Keyes et al. | 126/400 |
| 3,994,276 | 11/1976 | Pulver | 126/270 |
| 4,000,851 | 1/1977 | Heilemann | 237/1 A |
| 4,002,159 | 1/1977 | Angilletta | 237/1 A |

FOREIGN PATENT DOCUMENTS 2,267,531   4/1974   France ................................ 126/270

OTHER PUBLICATIONS

Domebook 2, p. 120 12/10/1971 by Day Chahroudi "Solar Energy".
Solar Research, p. 13, 1975, "Skylid".

Primary Examiner—Leslie Braun
Attorney, Agent, or Firm—Sughrue, Rothwell, Mion, Zinn and Macpeak

[57] ABSTRACT

A concrete slab forming a part of the building structure foundation is thermally insulated about its periphery from the ground upon which it resides from the ground surface to below the ground frost line, with the bottom of the slab in heat transfer relation to the ground below the frost line over a large part of the building structure surface area. The concrete slab directly overlies and is in thermal contact with an array of side abutting parallel rows of end abutting hollow cinder blocks to form air passageways for circulating air beneath the conrete slab and between the ground and the slab. By thermal siphon or forced air circulation, air, within the building structure transfers heat to and from the concrete slab, particularly heat entering glassed walls and impinging directly upon the surface of the concrete slab.

5 Claims, 4 Drawing Figures

SOLAR-HEATED CONCRETE SLAB BUILDING STRUCTURE

BACKGROUND OF THE INVENTION

1. Field of the Invention

This invention relates to solar heated building structures such as dwellings and the like, and more particularly, to such building structures wherein a concrete slab forms a portion of the building structure foundation and functions as a heat sink.

2. Description of the Prior Art

Building structures such as dwellings have been constructed on concrete slabs forming a major element of the building foundation. It has been determined that the concrete slab may act as a thermal storage device or heat or cold sink due to its affinity to store heat or cold for relatively long periods of time. Such concrete slabs have been formed to carry internal piping or conduits for the circulation of a liquid which is employed in the pick up of thermal energy by radiation upon a collector or heat exchanger mounted to the roof and facing the sun, whereby, during daylight hours thermal energy may be picked up by the collector and transferred to the slab, while during the night, the circulation of liquid within the piping embedded within the concrete may be employed in lowering the temperature of the rooms within the solar heated dwelling by transmitting thermal energy to the collector on the roof for dissipation to the now cooler external air. Such a solar heated dwelling is the subject matter of U.S. Pat. No. 4,000,851 issuing Jan. 4, 1977, to Volkmar Heilemann. In addition to storing heat within the concrete slab, a layer of rocks may be interposed beneath the concrete slab and in direct contact with the slab such that the rocks themselves act as a thermal storage mass and form part of the thermal heat sink.

Such solar heated dwellings are costly due to the expense of piping and circulation of the liquid between the heat exchangers constituting solar collectors on the roof and the concrete slab and mass of rocks acting as a heat sink for the concrete slab building structure. Further, such concrete slabs tend to transmit heat directly to the ground above the frost line resulting in a great loss of heat during winter operation and a reduction in efficiency of the system. Further, the bottom of the heat sink assembly, as constituted by the upper concrete slab and the lower mass of rocks, is normally completely thermally insulated from the ground, and while this prevents loss of heat from the heat sink to the ground, it fails to make use of a natural source of low temperature thermal energy.

SUMMARY OF THE INVENTION

The present invention constitutes an improvement in a concrete slab building structure which includes a concrete slab forming the building structure foundation which supports the building enclosure mounted thereon and is interposed between the building enclosure and the ground. The improvement resides in means for thermally insulating the periphery of the slab from the ground, downwardly from the surface of the ground to at least the extent of the ground frost line and the placement of a series of edge abutting parallel rows of end-to-end abutting hollow cinder or concrete blocks, in axial alignment underlying the concrete slab and axially aligned in heat transfer therewith and with the ground below the frost line. The hollow blocks form a series of parallel transverse air circulation paths and means are provided for communicating these air flow paths within said blocks to the interior of said building enclosure such that thermal radiation entering the building structure interior and impinging upon the building interior causes heat to be circulated by air flow through said parallel air flow paths within the cinder blocks and within the interior of said building above said slab with said concrete slab and cinder blocks acting as a heat sink.

Preferably, a layer of gravel extends between the concrete block layer and the ground to a level below the frost line to further act as a heat sink in conjunction with concrete blocks and said slab. A vapor barrier may underlie the concrete blocks and overlie the gravel. The building structure may further include vertical foundation walls mounted on a footing and extended within the ground to a distance below the frost line and surrounding the concrete slab, the array of concrete blocks, and the layer of gravel. Urethane thermal insulation sheet material extends vertically along the sides of the foundation walls facing the gravel and comprise said insulation means for insulating the periphery of the concrete slab from the ground. The building structure may comprise vertical walls extending upwardly from the foundation and being spaced therefrom and from the concrete slab by wooden sills which constitute, at least in part the thermal insulation means for the periphery of the concrete slab.

To facilitate solar heating of the concrete slab, the vertical walls of the building structure on the sides facing the sun may be provided with glass windows to permit direct impingement of the sun on the upper surface of the concrete slab and building structure interior to thermally heat air flowing within the building structure by convection, and thermal insulation shutters may be provided for selectively blocking off thermal radiation to and from the building through said windows.

DESCRIPTION OF THE PREFERRED EMBODIMENT

Figure 1:
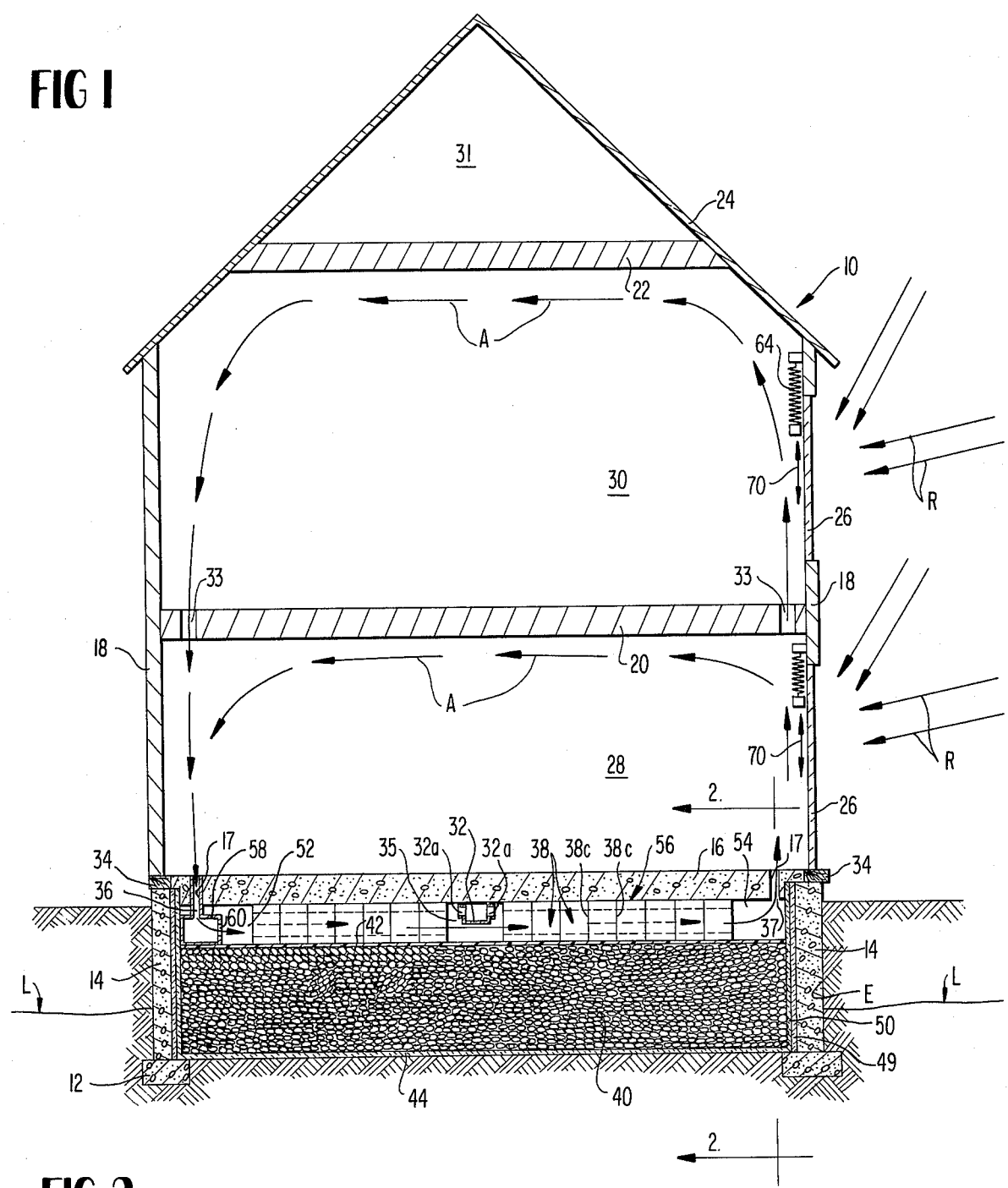
FIG. 1 is a sectional elevation of a concrete slab building structure employing the solar heating system of the present invention.

Referring to the drawings, there is shown a building structure such as a family dwelling, indicated generally at 10, and being of two stories, the building structure being erected upon footings 12 which in turn support vertical foundation walls 14 about all four sides of the building. These footings and foundation walls are mounted within an excavation E or rectangular hole within ground G determined by the horizontal dimensions of the building structure, the excavation penetrating to a certain vertical depth within the ground. Of importance to the present invention, is the fact that the excavation E extends to a level somewhat below the normal frost line L of the ground. That is, particularly in the northern sections of the country during the winter, the ground freezes progressively and to a distance vertically downward from the ground surface as determined by the length and severity of the freezing temperatures to which the ground is subjected. Nevertheless, below the frost line L, the ground maintains itself at a temperature of 40° to 50° F and therefore acts as a winter heat sink or summer cool sink which is very pertinent to the present invention. The building is shown in somewhat simplified form, particularly to stress the inventive concept which constitutes a solar heated system of simple construction and one which completely eliminates the necessity for liquid heat collectors and the piping necessary to feed or circulate liquid through a heat exchanger or collector mounted to the roof as is exemplified by the referred to patent.

Specifically, and important to the present invention, a concrete slab 16, which in the building structure 10 as shown is rectangular in form, extends between the foundation walls 14. The peripheral edge 17 of the concrete slab 16 is extended by wooden sills 34 upon which the vertical walls 18 of the building structure 10 are mounted, the wood sills constituting thermal insulation members and preventing good thermal conduction between the concrete slab 16, vertical walls 18, and the foundation walls 14 which are in direct contact with the ground G at the walls of excavation E. Embedded within the concrete slab 16, which may be, for instance, 7 inches in thickness, is 6×6×10/10 wire mesh for reinforcing purposes. The concrete slab 16 therefore thermally floats relative to foundation walls. Further, the building structure 10 which rests upon the foundation as partially defined by foundation walls 14, footings 12 and the concrete slab 16, is composed, in addition to vertical walls 18, of a roof 24 and horizontal floors at 20 and 22 defining a first floor 28, a second floor 30, and an attic 31 for the structure. Since the building structure is to be heated at least partially by solar energy, east, west and south walls including the right side vertical wall 18, FIG. 1, are provided with glass windows as at 26 for both first and second floors which permit direct radiation of the structure interior including the concrete slab 16 through the windows 26, whereby the heat is picked up by air circulated due to thermo-siphon effect as shown in FIG. 1 or alternatively by forced circulation through the utilization of one or more blowers which may be associated with a horizontal center duct 32 beneath slab 16.

Figure 2:
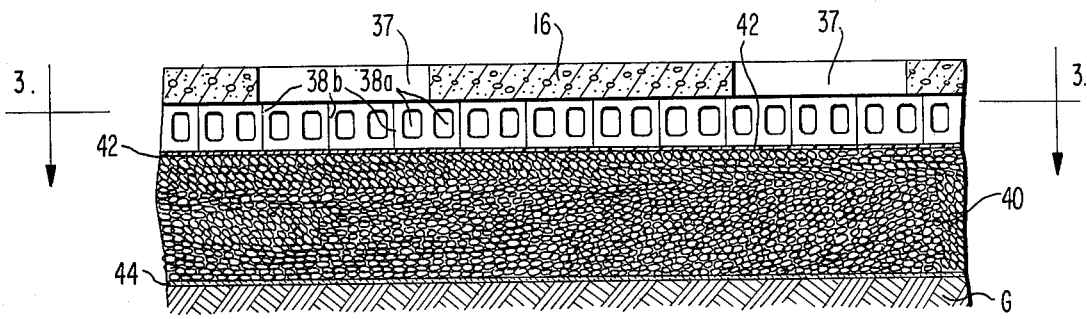
FIG. 2 is a vertical section of a portion of the building structure taken along about lines 2—2 of FIG. 1.
Figure 3:
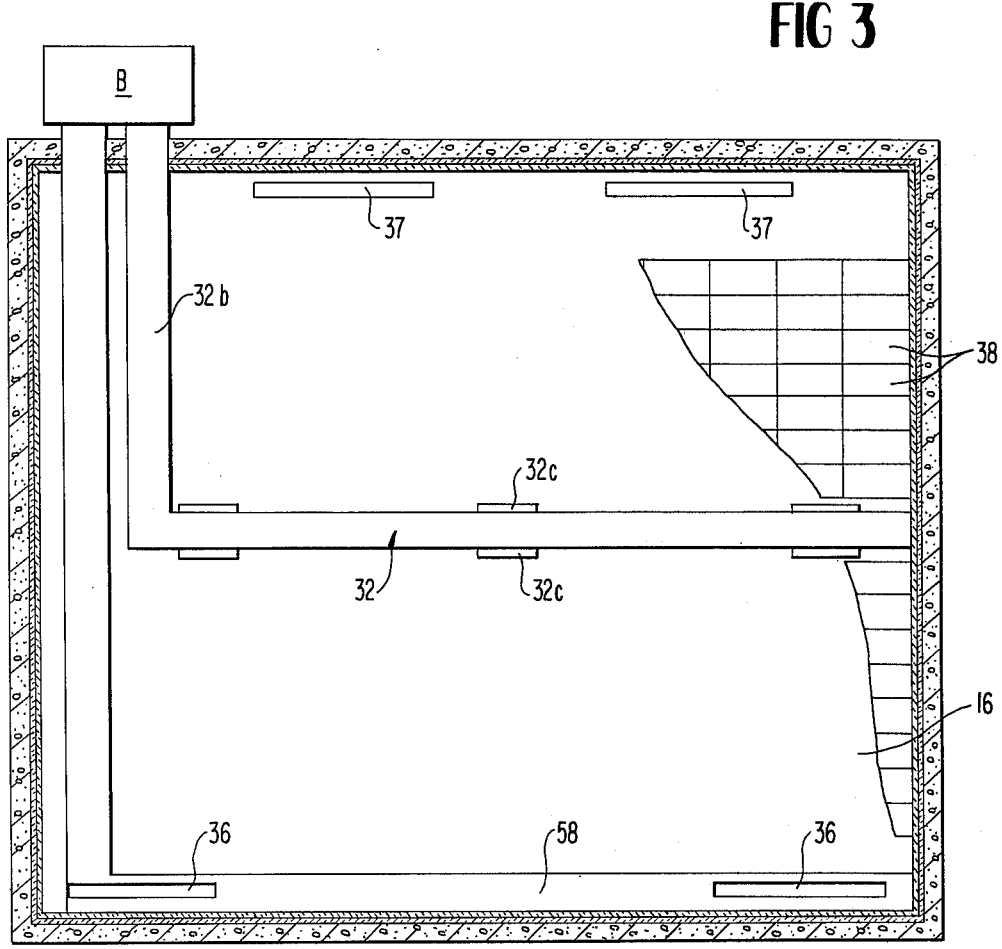
FIG. 3 is a horizontal sectional view of the building structure of FIGS. 1 and 2, partially broken away, to illustrate the duct work employed in the solar heating system of the present invention.

Important to the present invention is the utilization of a series of parallel rows of end-to-end abutting and axially aligned and side-to-side abutting cinder or concrete blocks indicated generally at 38 forming a cinder block array 56. The blocks 38 are hollow and formed with paired parallel passages or holes as at 38a. A single hole may extend through the blocks 38. The sides 38b of the blocks of adjacent rows abut each other while the ends 38c of respective blocks 38 within a given row abut each other and are in axial alignment, as may be seen by reference to FIGS. 1 and 2. Thus, the holes 38a of the blocks form elongated transverse air flow paths which extend from longitudinal or lengthwise passages 52 and 54 at opposite lateral ends of the cinder block array.

The cinder block array indicated generally at 56 forms in conjunction with the concrete slab 16 the basic heat sink for the solar heating system of the present invention. Preferably, the blocks 38 are positioned on top of a mass of gravel 40 which fills most of the excavation space between the foundation walls 14, the gravel being applied over a one inch styrofoam sheet material layer 44 which abuts the ground G below the frost line L such to permit thermal conduction between the gravel and the ground G over a full horizontal surface area corresponding to that of the concrete slab 16. The gravel acts in addition to slab 16 and cinder block array 56 to store some of the heat and permits heat by conduction to pass to and from the cinder block array 56 and the concrete slab 16 to the ground G. Interposed between the bottom of the cinder block array 56 and the gravel 40 is a vapor barrier 42 which may take the form of four mill polyethylene sheet material. In order to prevent heat transfer to that portion of the ground above the frost line L, about the periphery of the gravel 40, the cinder block array 56, and at least a portion of the concrete slab 16, there is provided a thermal insulation barrier in the form of paired thermal insulation sheets, constituted by an outer sheet 49 in direct contact with the side of the foundation walls 14 facing the gravel, and constituting preferably two inch urethane sheet material, while the interior layer or sheet 50 may comprise a continuation of the one inch styrofoam sheet material layer 44 lying between the gravel 40 and the ground G. If desired, one or more of the longitudinal passages 52 and 54 may carry a sheet metal duct or member such as 58 which extends the complete length of the building and which is provided at intermediate locations with lateral duct openings as at 60. In this case, both the bottom and the outside vertical walls of the sheet metal longitudinal duct member 58 is suitably covered with fiberglass thermal insulation to minimize radiation heat losses therefrom.

The cinder or concrete blocks 38 may comprise 12 inch standard weight concrete blocks having, as noted previously, two parallel holes 38a defining the horizontal transverse air paths for the multiple row cinder block array. Further, it is preferred that the blocks 38 be loosely placed but in end-to-end and axially aligned abutment and in side-to-side contact with other blocks of adjacent rows so as to define multiple rows which extend from the front to the rear of the building, FIG. 1. The cinder blocks 38 form parallel heat transfer air flow paths between the laterally spaced longitudinally extending ducts 52 and 54.

Even when the temperature outside of the building is 0° F, the ground G immediately beneath the sheet materials 44 and underlying the gravel 40 is from 40° to 50° F. This ground, therefore, acts as a heat source relative to the building structure interior, and regardless of any applied thermal energy input to the building interior above the concrete slab 16, there would be sufficient heat transfer by conduction to the cinder block array 56 from the ground G below the frost line L for pick up by the air circulating by thermal siphon effect through the first and second stories 30 and 28. This is sufficient to maintain the interior of the building at approximately 40° F or above freezing, and if the building were used as a vacation home or the like and unheated during the winter, this would be sufficient under most conditions to prevent freezing of the water pipes within the structure 10 regardless of lack of applied heat by a furnace, electric heater or other thermal energy input. However, due to the solar energy passage by way of the rays R through the windows 25, the slab tends to heat up as well as the interior walls of the building and floor, causing heat to be transmitted to the air circulating as indicated by the arrows A within these rooms and passing into and out of longitudinal passages 52 and 54 via the vertical slots 36 and 37, respectively, adjacent the periphery of the concrete slab and being transferred laterally through the horizontal air flow paths as defined by the aligned openings 38a within the various cinder blocks 38.

Further, some of the heat is transmitted by conduction through the walls 18, for instance, and picked up by convection of the air moving across those surfaces. The rooms 28 and 30 form natural mixing chambers; for instance, if there were a stove within the first floor, this would radiate heat to the interior of the first floor 28 where that heat would be picked up by the air circulating, arrows A, within that floor, and mixing with the air from the upper floor 30 and moving into the longitudinal passage 52 for transfer laterally through the cinder blocks. Preferably, the concrete slab is poured with the cinder blocks in place such that the concrete flows into intimate contact between and about the concrete blocks to in fact bury the blocks in situ, and in hardening to form a composite, basic two layer heat sink, that is, the upper layer constituting the concrete slab and the lower layer constituting the cinder block array.

As shown in FIG. 1, the wall containing the glass windows 26 is provided on the interior with thermal insulation shutters 64 which are shown as raised but which may be lowered as indicated by the double headed arrows 70 to overlie the glass 26 completely and to impede heat flow into and out of the building by both conduction and radiation. At night, therefore, the thermal insulation shutters 64 would be pulled and moved across the glass window to prevent heat loss from the building interior (except by natural conduction) through the walls and insulation shielded glass layer. Thus, the air circulating through the house and drawn through the passages defined by the openings 38a within the individual cinder blocks act in the summer to cool the house during the day and heat it in the winter. Heat transfer is particularly enhanced by the fact that the interior of the holes 38a of the cinder blocks are very rough and provide good heat transfer with the air which is prevented from laminar flow due to the roughness of the interior surfaces of these blocks.

It is estimated that a dwelling constructed in the manner of the present invention and functioning during the months of January and February of 1977 in employing the solar heating system of the present invention, provides approximately 40% of the heat load of the building, thereby effectively reducing the heat costs of the building by approximately a 40% factor during these months. Where the buildings are employed as family dwellings and the temperature is maintained from 65° F to 70° F within the building interior, there is some loss of heat through the gravel and insulation layer 44 to the ground, but this loss is relatively low since the $\Delta t$ is low. Obviously, the heat loss of the building above the slab is controlled by the thermal insulation for the external walls, the roof structure and/or the ceiling between the upper story and the attic. However, the novel solar heating system of the present invention is characterized by the utilization of south facing windows as at 26 which are about 80% efficient in contrast to the best liquid roof collector which is between 40% and 60% efficient. Thus, the present invention needs only about one-half the glass area to collect the same amount of solar energy as compared to a roof mounted collection system. Further, the heat is radiated directly to the concrete slab which acts as a heat sink and the excess heat is readily stored within the first floor concrete slab. The stored heat subsequently assits in heating the home at night and on cold days by radiation from the slab, the cinder block array 56 and the gravel 40. The presence of the vertical air passages 33, 36, 37 in the various floors permit the heat derived from a wood burning stove in the family room to be either distributed to other parts of the dwelling or to be placed in storage via the passages 38a within the cinder blocks.

at any point where direct sunlight enters through windows, the sun radiates and heats the building interior, i.e., the concrete, the surrounding walls or upper floors even through layers of linoleum, rugs, etc. There is natural transfer of heat therefore by conduction and convection. Thermal siphon effect of mechanical blowers for positive circulation of the air, is such that the temperature of the air captured within the internal volume of the dwelling tends to become the temperature of the slab. The house acts as a mixing chamber so that any central or localized heat causes the temperature at the slab to pick up some of the heat.

Figure 4:
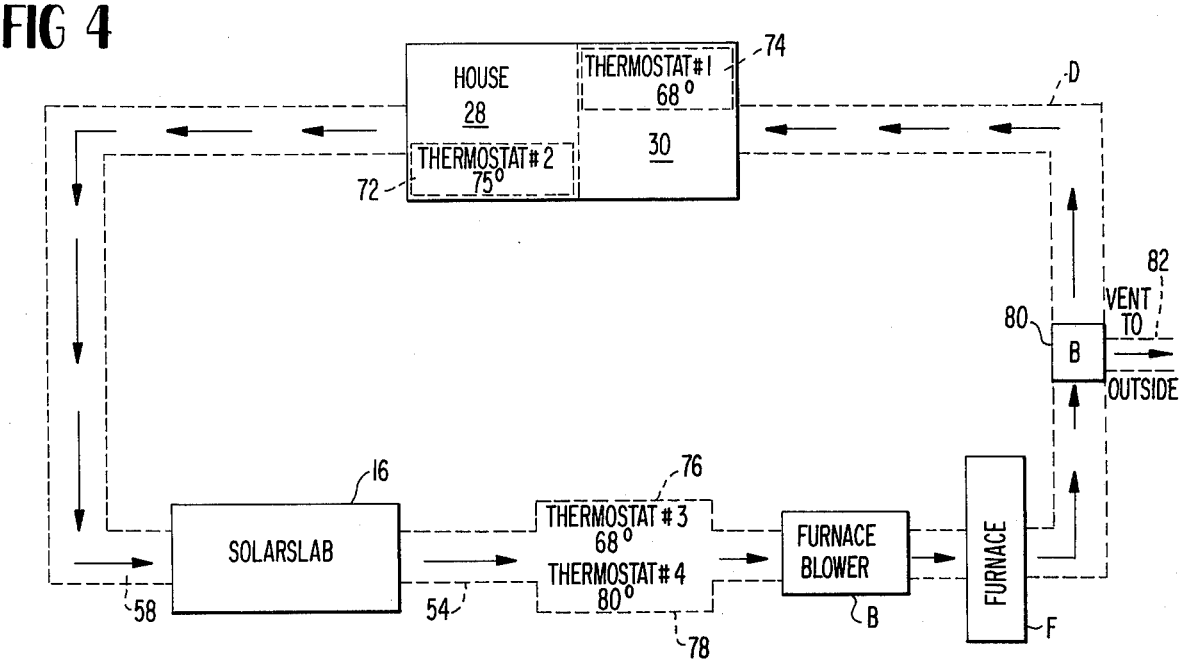
FIG. 4 is a block diagram schematic view of a hot air assisted solar heating system for use in the building structure of FIGS. 1-3.

By reference to FIG. 1, it may be seen that the transverse rows of concrete or cinder blocks 38 are interrupted at approximately the center of the building to form a third longitudinally extending air passage 35 which parallels passages 52 and 54. Within this passage 35 is mounted the sheet metal cold air return duct 32, being provided with a series of lateral openings as at 32a which permit selectively air flow to be achieved by way of a mechanical blower associated with the cold air return duct 32 as at B within L portion 32b, thereby pulling air, FIG. 1, from the left and the right to the center longitudinal passage 35 in contrast to the circulation of the air as shown in FIG. 1, wherein the air enters passage 52, passes by the duct holes from left to right and exits back to the building interior through vertical openings 36. In the absence of blower operation, thermal siphonic air circulation occurs as in FIG. 1, this being achieved by the warm south wall and cold north wall setting up convection currents. When the air circulation is required, for instance, at night when the house temperature is less than 72° F, forced air circulation occurs by energizing blower B and causing air to flow down along both walls and to the center of the cinder block array from left and right and for discharge into the building interior rooms through the cold air duct return openings within respective rooms (not shown). A typical operation involving the passive, thermal siphonic air circulation solar heating system of the present invention in conjunction with a furnace. In that regard, reference to FIG. 4 shows diagrammatically the operation of such system in which the building structure enclosure identified as the house is connected via duct work D to the solar slab duct work indicated by schematic lines to the solar slab 16, there being a thermostat 3, operable at 68° F within the duct work, as at 76, a thermostat 4 operable at 80° F within the duct work, as at 78, the furnace blower B, a furnace F and a damper which selectively vents the air circulating with the duct work D to the outside, via vent extension 82, although normally it circulates the air flow through the house. Within the schematic diagram of FIG. 4, thermostat 1 may be located on the second floor 30 of the building structure having a day setting of 68° F such that the contacts close below 68° F, thermostat 2 for instance could be located on the first floor and set for 75° F, such that the contacts close below 75° F. Thermostat 3 is located in the fan duct upstream of the blower B, set for 68° F, that is, its contacts close below 68° F, while thermostat 4 is also located in the fan duct and set at 80° F with its contacts closing below 80° F. In a typical installation, therefore, with the employment of such thermostats, a typical winter operation would be one in which thermo-siphon effect may be employed for circulation of air, particularly with adequate thermal input by radiation through the windows 26 of the building. Forced air circulation would occur with the furnace blower motor operating when the temperature within the downstairs of first floor room 28 drops below 75° or the air temperature within the second floor drops below 68°. Further, if the air temperature in the furnace blower drops below 68°, the furnace gun and the blower are operating so that the furnace adds heat to the powered forced air being circulated through the system. If the air temperature into the furnace blower is greater than 68° F, the furnace gun does not go on, and the warm air is circulated from the solar slab 16 which is sufficient to maintain proper temperature within the rooms of the building structure 10.

In contrast, during summer and under the cooling mode, the operator manually closes a switch for instance on a time clock to allow the blower B to operate from twelve o'clock midnight to 4:00 A.M. continuously. During this time, the motorized damper 80 exhausts warm air to the outside through the vent duct 82. Upon building structure overheat, the thermostat 2 will effect circulation of cool air from the solar slab should the house overheat during the day, with the vent damper 80 closed in the sense that air is continuously circulated through the house and duct work and is not vented to the outside by way of the vent duct 82 which is closed off to the main duct work D. Thermostat 4 is an override shut off control for summer cooling. In summar time when the air temperature coming out of the solar slab exceeds the setting on thermostat 4, i.e., 80° F, this calls for an override for system shut down. In other words, the capacity of the solar slab to absorb heat has been exceeded, so that 80° F would tend to make the house uncomfortable. The blower now shuts off. That is the point at which a mechanical air conditioner (not shown) would have to operate, or if there is no mechanical air conditioner, the house windows would have to be opened and the house vented, because the primary heat sink has absorbed all the heat it is capable of doing within its capacity.

In its most simple sense, it is evident that the solar heating system of the present invention as applied to a slab constructed house permits the hosue to be continuously in thermal balance, that is, if the solar slab 16 is at a temperature too high with respect to the building interior, heat will be given off and circulated through that building. Further, the solar slab will lose some heat continuously due to the temperature differential which exists between the slab and the ground G and across the concrete block array 56. Should the air be warmer than the solar slab, obviously heat is given up during air circulation. Further, the existence of the thermal insulation shutters permits the heat loss or heat input through the windows to be readily varied to meet changing conditions. Purposely, the storage capacity of the heat sink, that is, the mass of concrete and gravel and cinder blocks must be balanced to the heat gain and heat loss of the building, the heat gain being principally on the south side through the windows and the heat loss by way of radiation throughout the building and some minor radiation through the gravel 40.

The solar heating system of the present invention has the natural ability to store at low purchased energy cost hundreds of thousands of BTU per day in excess of the normal house needs for the period of solar energy collection, which BTUs are stored within the heat sink compositively formed of the solar slab, the cinder blocks and the gravel. The stored BTUs are then available for heating the house in the winter during the night and ensuing cloudy days and in the summer for expulsion at night. Of course, the storage capacity may be readily varied as may the heat gain and heat loss characteristics of the building so as to ensure proper balance depending upon the geographical location of the building and exposure to the solar radiation. The present invention advantageously employs these factors in the creation of a simplified, preferably passive solar energy heating and cooling system.

While the invention has been particularly shown and described with reference to a preferred embodiment thereof, it will be understood by those skilled in the art that various changes in form and details may be made therein without departing from the spirit and scope of the invention.

What is claimed is:

1. In a building structure comprising a building structure foundation supporting a building enclosure mounted thereon, said building enclosure comprising laterally spaced, opposed sidewalls, the improvement comprising:
   a concrete slab underlying said building structure, being within said foundation, forming the ground floor of said building structure and being interposed between said building enclosure and the ground,
   thermal insulation surrounding the periphery of said concrete slab and extending from the surface of the ground at a level below the ground frost line,
   an array of hollow cinder blocks, said cinder blocks underlying said concrete slab, being in situ with said slab,
   a layer of gravel interposed between said cinder blocks and the ground and extending below the frost line such that the gravel forms in addition to the concrete slab and cinder blocks a portion of a composite three layer heat sink,
   said array of hollow cinder blocks comprising generally parallel rows of end-to-end abutting, generally axially aligned, hollow cinder blocks, forming multiple horizontal air flow paths through said cinder blocks directly beneath said concrete slab, said multiple horizontal air flow paths extending transversely between said opposed side walls, said concrete slab and said cinder blocks extending the full distance between said opposed sidewalls, one of said opposed sidewalls being essentially devoid of windows and the other of said opposed sidewalls having windows extending over a substantial area thereof, and
   means defining air passages extending longitudinally along both ends of said array of cinder blocks, and being open to the air flow paths through said cinder blocks, and vertical air flow paths through said concrete slab from said building enclosure interior to said air passages and wherein said one of said opposed sidewalls faces the direction of major solar radiation and the other of said opposed sidewalls faces away from said direction of major solar radiation such that direct solar radiation through said one of said opposed sidewalls into said building enclosure interior and onto said slab causes a natural thermal syphonic air circulation loop through said building enclosure interior and through said vertical air flow paths within said solar slab and said horizontal air flow paths through said cinder blocks with said concrete slab and said cinder blocks and said gravel constituting a low thermal impedance heat sink for reception and release of heat transmitted to the building by conduction from the ground through the cinder blocks, by direct solar radiation of said concrete slab and by convection of air passing over said concrete slab with said heat sink effectively storing heat during solar radiation of said building structure but remaining at a temperature less than that of said building enclosure interior.

2. The building structure as claimed in claim 1, further comprising a vapor barrier interposed between said concrete block array and said layer of gravel.

3. The building structure as claimed in claim 1, wherein said foundation gravel is excavated, said foundation structure comprising vertical foundation walls abutting the sides of the excavation and in contact with the ground and extending vertically below the frost line, and wherein said means for thermally insulating the periphery of said slab comprises at least one layer of thermal insulation sheet material extending vertically along the inside surface of said vertical foundation walls and interposed between said slab, said cinder block array, and said layer of gravel.

4. The building structure as claimed in claim 3, wherein said thermal insulation means further comprises a layer of thermal insulation material interposed between the bottom of said gravel layer and the ground beneath the frost line to reduce the rate of heat transfer between the ground and said gravel.

5. The building structure as claimed in claim 4, wherein said building structure comprises vertical walls constituting vertical extensions of said foundation walls and wherein wood sills are interposed between the vertical sidewalls of said building and the transfer between the building structure elements and the ground above the frost line.

* * * * *